Figure 1:
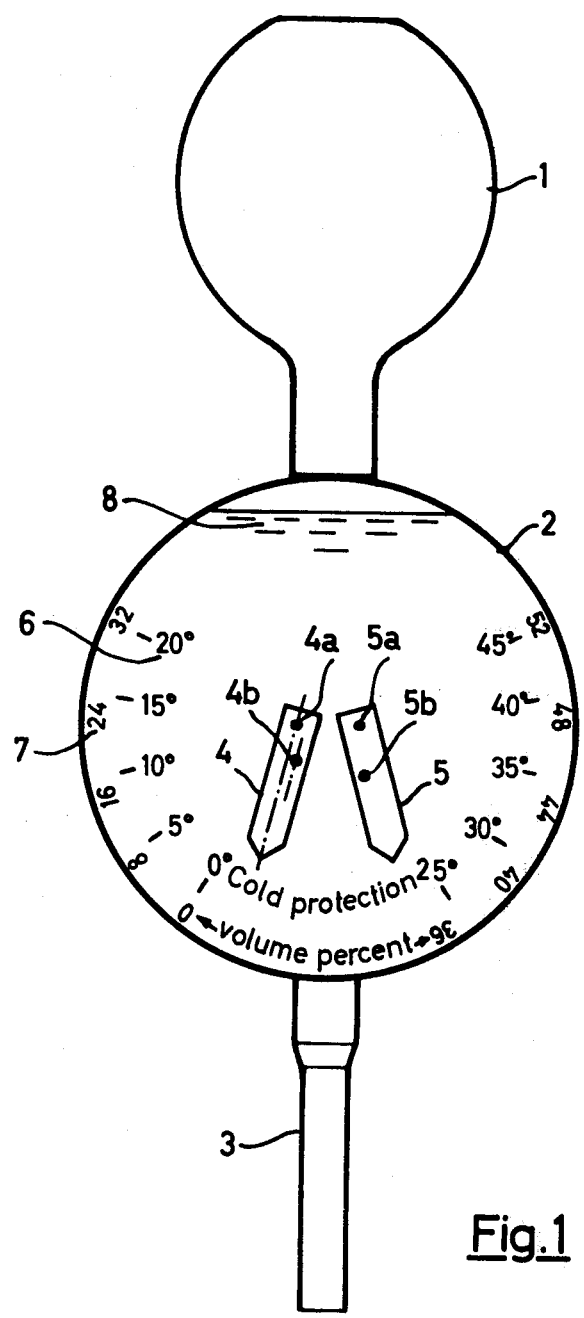

United States Patent [19]

Schwen et al.

[11] 3,908,467
[45] Sept. 30, 1975

[54] DENSITY MEASURING APPARATUS, WITH PLURALITY OF PIVOTED FLOAT INDICATORS OF DIFFERING BUOYANCIES

[75] Inventors: Roland Schwen, Friedelsheim; Theodor Weber, Ludwigshafen, both of Germany

[73] Assignee: BASF Aktiengesellschaft, Ludwigshafen (Rhine), Germany

[22] Filed: Nov. 23, 1973

[21] Appl. No.: 418,306

[30] Foreign Application Priority Data
Nov. 25, 1972 Germany.......................... 2257924

[52] U.S. Cl................................. 73/454; 73/440
[51] Int. Cl.² ...................................... G01N 9/00
[58] Field of Search ............. 73/440, 441, 451, 454

[56] References Cited
UNITED STATES PATENTS
2,674,120    4/1954    Trainor ............................. 73/454
2,691,296   10/1954    DeGiers ........................... 73/451
3,451,273    6/1969    Ludlow ............................ 73/440
3,722,292    3/1973    Pietramale ....................... 73/454

FOREIGN PATENTS OR APPLICATIONS
543,515    7/1957    Canada ............................ 73/454

Primary Examiner—Donald O. Woodiel
Assistant Examiner—John S. Appleman
Attorney, Agent, or Firm—Johnston, Keil, Thompson & Shurtleff

[57]                ABSTRACT

Density-measuring apparatus particularly adapted for measuring aqueous antifreeze solutions, in which the density-dependent coefficient of expansion of the liquid material is taken into account over the desired measuring range by the use of more than one buoyant element.

13 Claims, 4 Drawing Figures

DENSITY MEASURING APPARATUS, WITH PLURALITY OF PIVOTED FLOAT INDICATORS OF DIFFERING BUOYANCIES

The present invention relates to an apparatus for measuring the density of liquid materials, and in particular for measuring the density of aqueous antifreeze solutions, for example on the basis of ethylene glycol, according to the Archimedes Principle, consisting of a transparent measuring vessel equipped with suction means, a buoyant element with associated scale, preferably for the mean content of antifreeze in the solution, which buoyant element is in the form of a lever of uneven mass distribution movably mounted on a preferably horizontal axis so that its free end describes a circular path.

The concentration of aqueous solutions of antifreeze is determined by measuring the density. Such measurement is generally carried out by means of a floating hydrometer. However, since the density varies considerably with temperature, it is also necessary to measure the temperature of the antifreeze solution and then to consult a table giving the content of antifreeze agent in the solution for the values of density and temperature ascertained.

In order to accelerate this complicated method of measurement, equipment has been proposed in which compensation is made for the temperature. One way of doing this is to use a scale which is moved by changes in temperature acting on a thermocouple, and another method consists in simultaneously measuring a reference liquid of the same temperature.

A device measuring the concentration of salt in aqueous solutions is also known, this having a float which has the same coefficient of expansion as the liquid only at a mean salt content of 2/32. The disadvantage of this measuring device is that the density of the float provided with a bore is generally not the same as the density of the liquid over the temperature range used. Thus measurement can only be accurate at one particular temperature, the inaccuracy of measurement increasing with the degree of deviation of the temperature from said value.

The same applies to other prior art floats. These are also unable to give accurate measurements at various temperatures.

German published application No. 1,273,867 discloses a method of determining a single (minimum) concentration of antifreeze agent by the use of a spherical float having a coefficient of expansion equal to that of the solution.

Another known apparatus for measuring the density of aqueous antifreeze solutions is one having as buoyant element a single pointer made of plastics material, the coefficient of expansion of said pointer being dependent on the material of which it is made, thus making it impossible to vary its coefficient of expansion to make it equal to the coefficients of expansion of the solution at various concentrations.

Thus the drawbacks of these prior art devices are that either it is necessary to carry out separate determinations of density and temperature of the solution being measured or the variations in density with temperature are ignored in the measurement thus giving rise to errors of measurement, or measurement is carried out with only one buoyant element so that only one concentration can be determined.

According to the present invention, the said drawbacks are overcome in that the density-dependent coefficient of expansion of the liquid being measured is taken into account, over the range of measurements to be carried out, by the use of more than one buoyant element.

Accordingly, in one embodiment of the invention there are provided two buoyant elements which move in the manner of levers and are pivotally mounted in the measuring vessel.

Advantageously, the two buoyant elements are of materials of different densities and have their pivot points at different distances from their centers of gravity.

According to the invention, the uneven distribution of mass in the buoyant elements is achieved by placing commercial shaped articles of minimum size tolerances, such as a stainless steel ball as used in ball bearings, in said elements in asymmetrical positions.

According to a further embodiment of the invention, the unevenness of mass distribution and/or the assymetrical arrangement of each buoyant element may be achieved by using different plastics materials in the same element.

Advantageously, the buoyant elements for measuring different ranges of density are provided with different colors and are mounted in the measuring vessel so as to pivot in opposite directions. The scales are then preferably provided on opposite parallel faces of the measuring vessel.

To establish the correct position of the vessel during measurement there are provided one or more parallel marks on at least one of the faces of the measuring vessel, which marks should be brought into a state of being parallel to the level of the solution being measured in the vessel.

The invention is described below with reference to the drawings, in which

Figure 2:
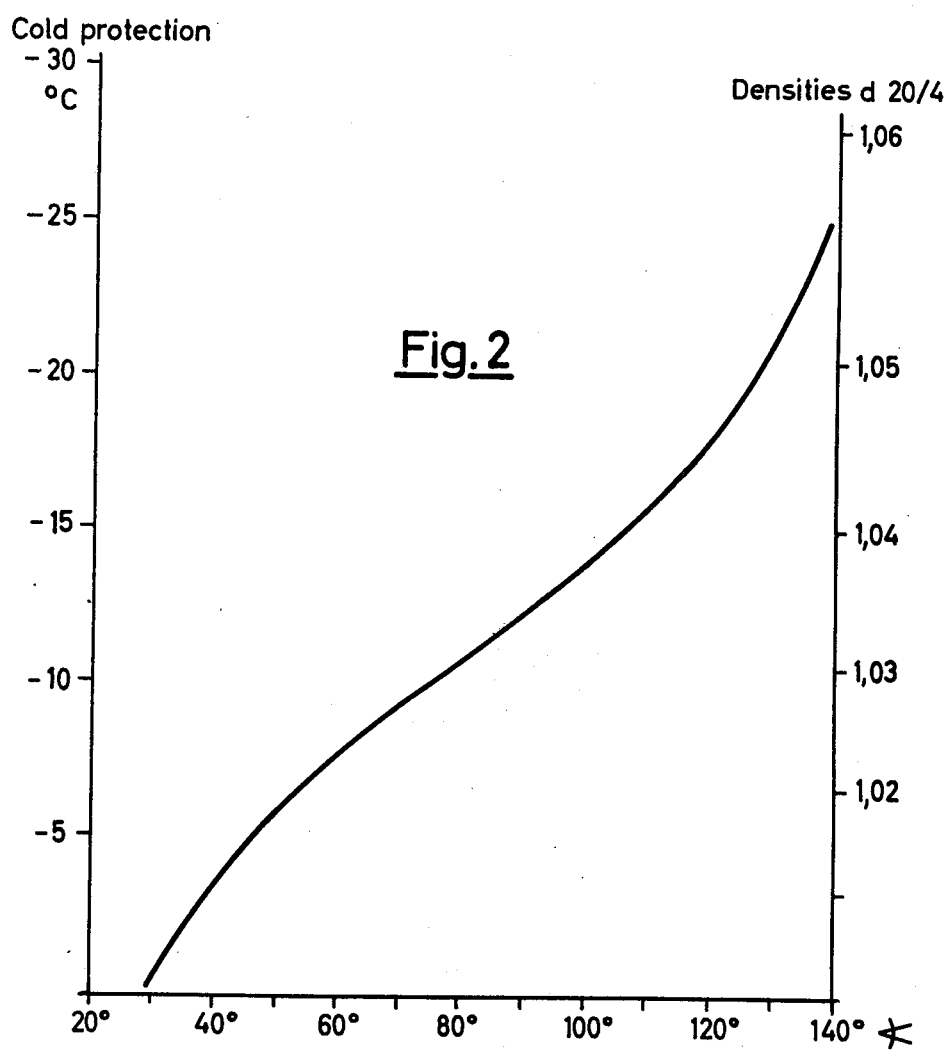
Figure 3:
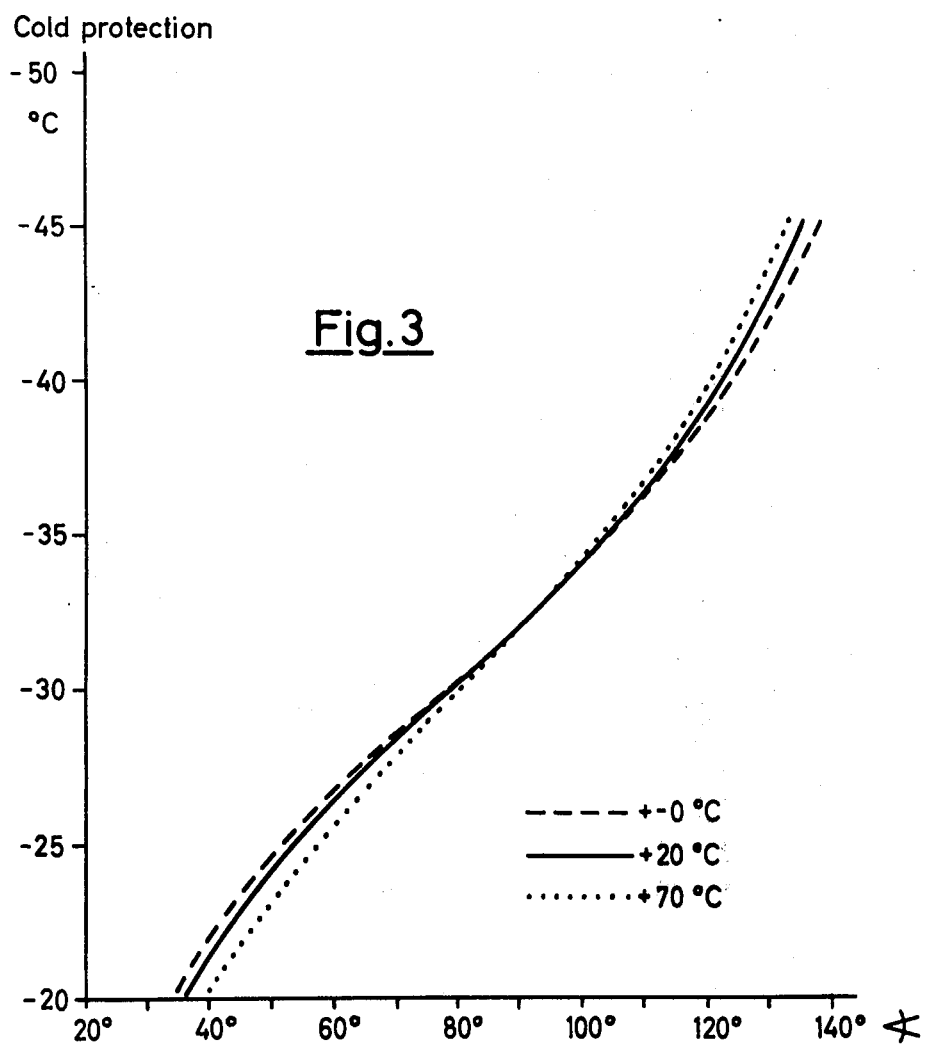
Figure 4:
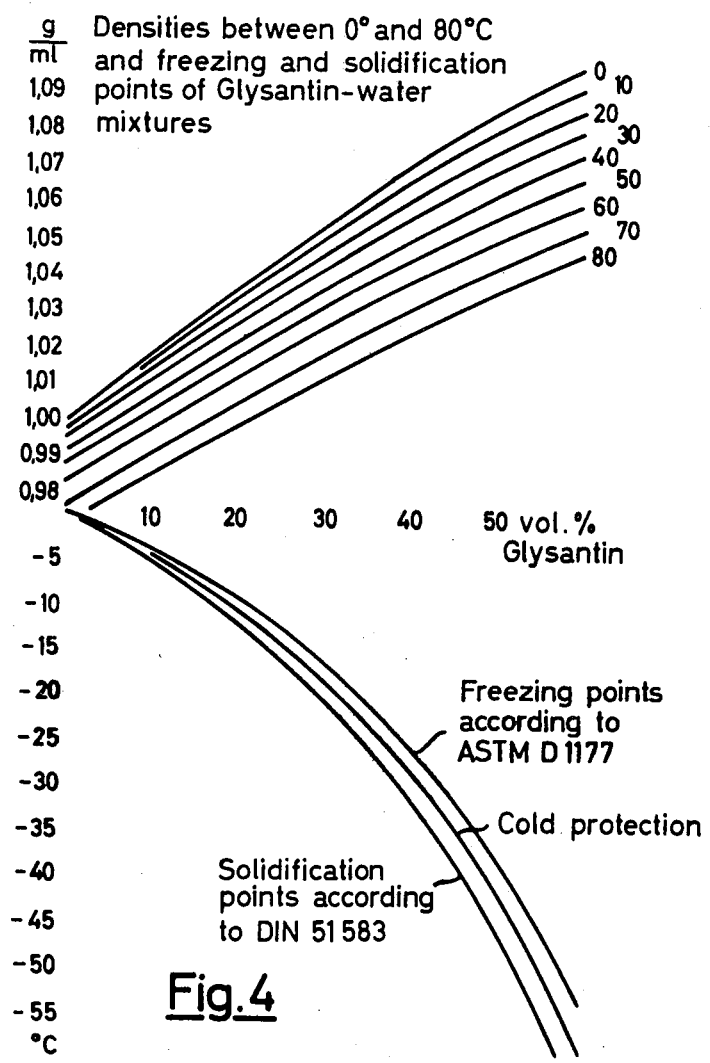

FIG. 1 shows a device of the invention for measuring the density of liquid materials, FIG. 2 is a graph showing the relationship between the density and the angle of deflection, FIG. 3 is a further graph showing angular deflection plotted against density at higher antifreeze concentrations and at various temperatures of measurement, and FIG. 4 shows curves of densities at temperatures of from 0° to 80°C and the freezing and solidification points of Glysantin/water systems.

Two pointers 4 and 5 are pivotally mounted in a measuring vessel 2 on axes 4a and 5a. By means of a rubber suction ball 1, the liquid to be tested is sucked into the vessel via a tube 3 approximately up to the horizontal marks 8. The measuring vessel 2 is vertical when the level of the liquid in the vessel is parallel to said marks 8.

The pointers 4 and 5 are made of suitable plastics materials, e.g., polypropylene and polyethylene. To each of these pointers there is anchored a weight 5a and 5b of heavier material, e.g., austenitic ball bearing balls (material No. 1.4300), which weight is positioned on the pointer asymmetrically in such a manner that the angle of deflection of said pointers 4 and 5 provides a measure of the density of the solution being tested. The choice of materials and dimensions makes it possible to achieve maximum adaptation to the expansion properties of the liquid. The pointer 4 is made so as to be capable of indicating solutions having densities of from $d\ 20/4 = 1.0$ (water) to $d\ 20-4 = 1.049$ (32% v/v solution of antifreeze based on glycol in water). In the case of solutions of greater concentration, this pointer goes beyond its associated range of measurement and the second pointer gives the desired information from $d\ 20/4 = 1.057$ to $d\ 20/4 = 1.078$.

Conveniently, the housing of the vessel has a scale, not of densities, but of the more relevant temperatures to which cold protection is given and, if desired, of the concentration of the liquid in % v/v.

The pointers 4 and 5 each have an asymmetrically positioned point of greater weight in order to produce an angular deflection of the pointers at various densities. It is obvious that if pointers 4 and 5 lacked said asymmetrical system of buoyancy contra gravity, they would point either straight down or straight up depending on whether they are heavier or lighter than the solution being measured. However, the arrangement of the invention produces a clear relationship between the angle of deflection of the pointers 4 and 5 and the concentration of the solution (cf. FIGS. 2 and 3) and thus the densities $d\ 20/4$. By carefully selecting the plastics materials and the extent of asymmetrical weighting 5a and 5b of the pointers 4 and 5, it is possible to produce measurements of the density which are very little affected by variations in temperature, as shown in FIG. 3. This Figure shows the very small degree of variation in the relationship of angular deflection (abscissa) and antifreeze concentrations (ordinate), given in °C and cold protection, as found at three different measuring temperatures, i.e., 0°C, 20°C and 70°C.

Asymmetrical weighting of the pointers 4 and 5 is successfully achieved using commercial ball bearing balls 5a and 5b of austenitic steel (material No. 1.4300) having a diameter of three-sixteenths inch. Said ball is placed in a mold prior to injection molding and the plastics, for example polypropylene, is injected into the mold so as to surround said ball. Alternatively, a suitable recess is formed in the pointers 4 and 5 and the ball or some other weight such as a roller, preferably of non-corrosive metal or heavy plastics material such as polyvinyl chloride, is anchored in said recess in a second operation.

Aqueous antifreeze solutions have different coefficients of expansion depending on their concentration, i.e., the coefficient of expansion is relatively small in dilute solutions and relatively large in concentrated solutions. This relationship is illustrated in FIG. 4 with reference to Glysantin/water systems given by way of example, where it is seen that the curves of density plotted against concentration of Glysantin change in steepness. Since any one pointer can have only one coefficient of expansion according to the material of which it is made, it is not possible for one pointer to give low-error measuring results over the entire range of densities to be measured.

The use of a number of pointer 4, 5 for various measuring ranges in the apparatus of the invention makes it possible to dispense with temperatures and corresponding corrections of the densitiy measurements obtained. The value required can be read from the scale directly. It will also be appreciated that the use of different scales for different ranges of measurement increases the accuracy of measurement. If an even greater accuracy of measurement is required, it is possible to use a third pointer or even more pointers having coefficients of expansion or densities which have been made similar to those of the solutions to be measured in the particular range by uniformly blending fillers with the plastics materials. This is possible by taking a lightweight basic material having a high coefficient of expansion, e.g., polyethylene, and modifying this by the addition of heavier materials having small coefficients of expansion, e.g., aluminum or copper powder.

We claim:

1. Apparatus measuring the density of liquid materials and particularly for measuring the density of aqueous antifreeze solutions, for example on the basis of ethylene glycol, according to the Archimedes Principle, consisting of a transparent measuring vessel equipped with suction means, a plurality of buoyant elements with associated scales, preferably for the antifreeze content in the solution, each buoyant element is in the form of a lever of uneven mass distribution movably mounted on a substantially horizontal axis so that its free end describes a circular path, said elements being of different buoyancies, wherein the density-dependent coefficient of expansion of the liquid being measured is taken into account over the range of measurements to be carried out.

2. Apparatus as claimed in claim 1 and having two buoyant elements which are pivotally mounted in the measuring vessel and are moved in the manner of levers.

3. Apparatus as claimed in claim 2, wherein the said two buoyant elements are made of materials having different densities.

4. Apparatus as claimed in claim 2, wherein the said two buoyant elements have different distances between their pivot points and their centers of gravity.

5. Apparatus as claimed in claim 1, wherein the uneven mass distribution of the buoyant elements is produced by asymmetrical positioning on said elements of shaped articles of minimum size tolerances.

6. Apparatus as claimed in claim 1, wherein the uneven mass distribution of each buoyant element is produced by the use of different plastics materials in the same buoyant element.

7. Apparatus as claimed in claim 1, wherein said buoyant elements have different colors for the different ranges of density to be measured.

8. Apparatus as claimed in claim 2, wherein the said two buoyant elements are mounted in the measuring vessel in such a manner that they pivot in opposite directions.

9. Apparatus as claimed in claim 1, wherein the scales are provided on opposite faces of the measuring vessel, said faces being preferably parallel to each other.

10. Apparatus as claimed in claim 1, wherein in order to establish the correct position of the vessel during measurment there are provided one or more parallel marks on at least one of the faces of the measuring vessel, which marks should be brought into a state of being parallel to the level of the solution being measured in the vessel.

11. Apparatus for measuring the density of liquids such as aqueous antifreeze solutions which comprises a transparent vessel adapted to hold the said liquid, suction means for drawing said liquid into said vessel, a first buoyant element pivotally mounted in said vessel for pivotal movement wherein its free end swings under buoyancy by said liquid in a circular path, counter-gravity weight means on said element asymmetrically positioned thereon to provide a pivotal movement of said element as a function of a first range of the densities of the liquid in said vessel, scale means for reading the degree of pivotal movement of said element, a second buoyant element of a buoyancy different from the buoyancy of said first element and pivotally mounted in said vessel for pivotal movement wherein its free end swings under buoyancy by said liquid in a circular path, counter-gravity weight means on said second element asymmetrically positioned thereon to provide a pivotal movement of said second element as a function of a second range of densities of the liquid in said vessel, and second scale means for reading the degree of pivotal movement of said second element.

12. Apparatus as claimed in claim 11 wherein said first and second buoyant elements are mounted in said vessel for buoyant pivotal movement in opposite directions.

13. Apparatus as claimed in claim 11 wherein said first and second scale means are provided on opposite faces of said vessel.

* * * * *